No. 617,172. Patented Jan. 3, 1899.
J. LINDSEY.
VEHICLE.
(Application filed June 8, 1898.)
(No Model.) 2 Sheets—Sheet 1.

WITNESSES:
Donn Mitchell

INVENTOR
J. Lindsey.
BY
ATTORNEYS.

THE NORRIS PETERS CO., PHOTO-LITHO., WASHINGTON, D. C.

No. 617,172.  
J. LINDSEY.  
VEHICLE.  
(Application filed June 8, 1898.)  
Patented Jan. 3, 1899.

(No Model.)

2 Sheets—Sheet 2.

WITNESSES:
Donn Turtchell
J. Hedticker

INVENTOR
J. Lindsey
BY
ATTORNEYS.

UNITED STATES PATENT OFFICE.

JOHN LINDSEY, OF SANDERSVILLE, MISSISSIPPI.

VEHICLE.

SPECIFICATION forming part of Letters Patent No. 617,172, dated January 3, 1899.

Application filed June 8, 1898. Serial No. 682,886. (No model.)

*To all whom it may concern:*

Be it known that I, JOHN LINDSEY, of Sandersville, in the county of Jones and State of Mississippi, have invented new and useful Improvements in Vehicles, of which the following is a full, clear, and exact description.

The object of the invention is to provide a vehicle especially adapted for hauling logs, timber, and other bulky and heavy material and to so construct the vehicle that the trucks will be supple and so built that they will give or yield vertically and laterally without deteriorating from their stability, enabling any of the wheels to have free vertical movement in passing obstructions without materially increasing the load strain on the wheels.

Another object of the invention is to provide for an even distribution of the weight of a load upon all of the wheels of the vehicle.
I will describe a vehicle embodying my invention, and then point out the novel features in the appended claims.

Reference is to be had to the accompanying drawings, forming a part of this specification, in which similar characters of reference indicate corresponding parts in all the views.

Figure 1:
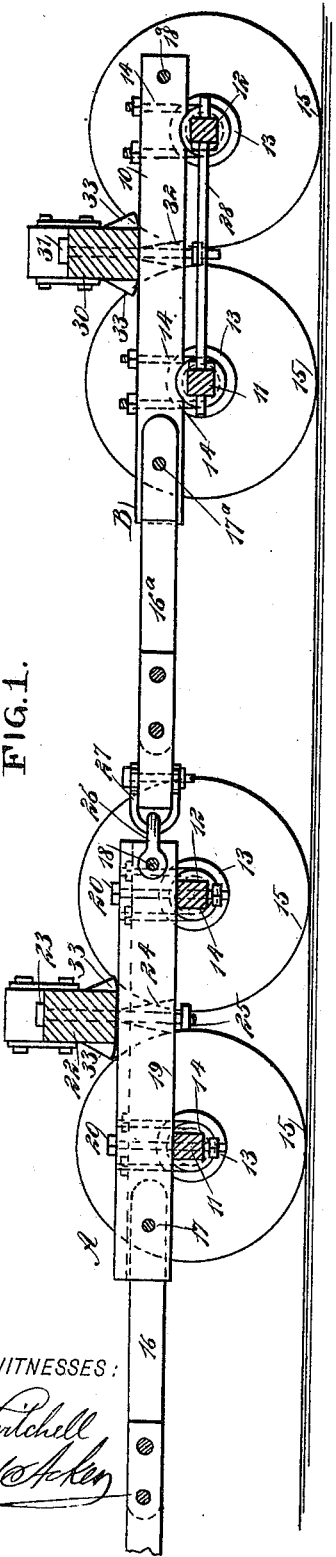
Figure 2:
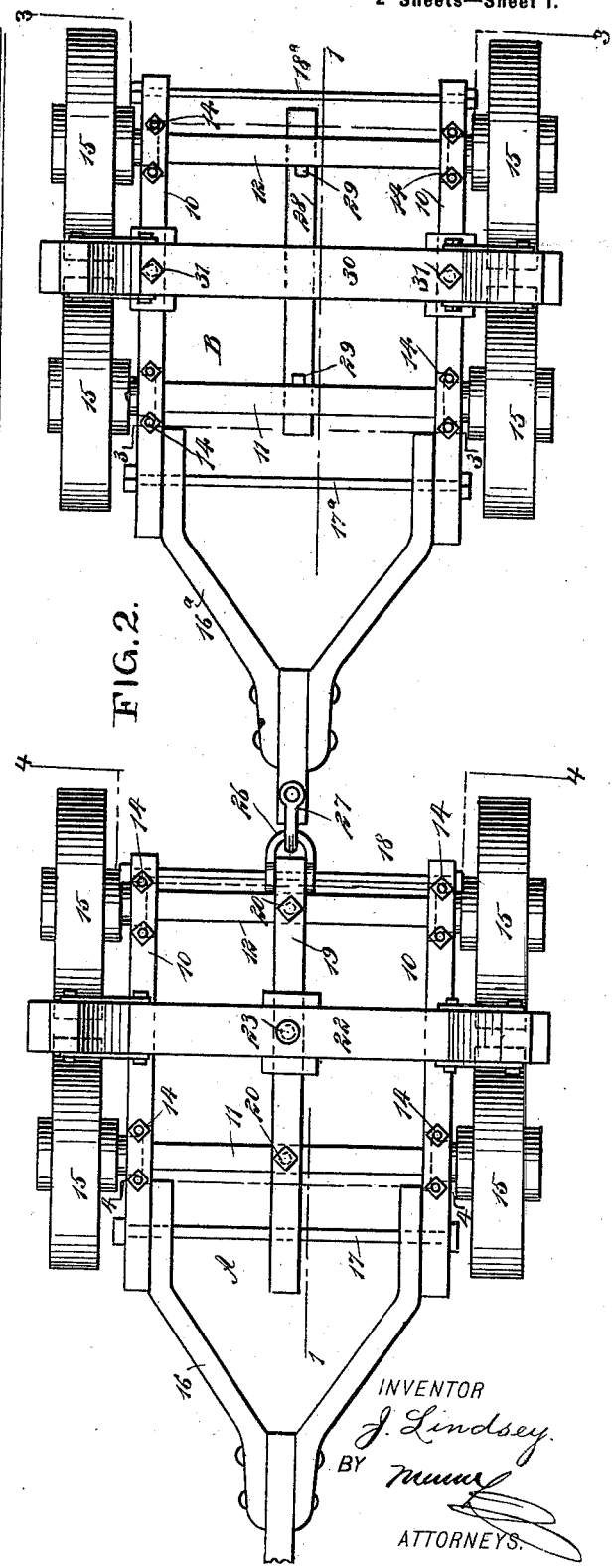
Figure 3:
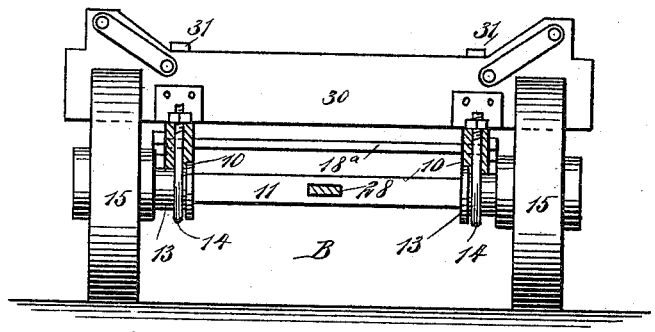
Figure 4:
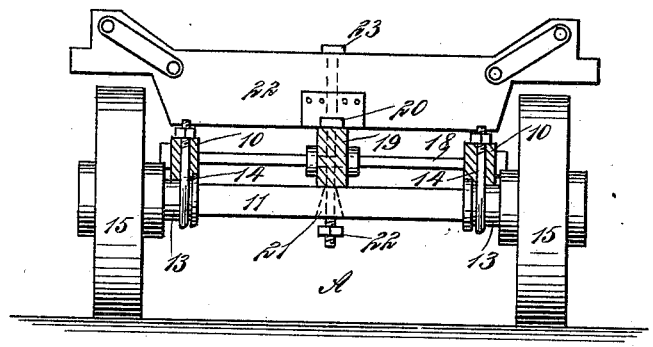
Figure 5:
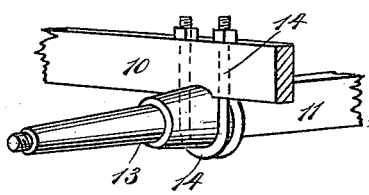

Figure 1 is a longitudinal vertical section taken substantially on the line 1 1 of Fig. 2. Fig. 2 is a plan view of the vehicle. Fig. 3 is a transverse section through the rear truck of the vehicle, taken practically on the line 3 3 of Fig. 2. Fig. 4 is a transverse vertical section taken through the forward truck substantially on the line 4 4 of Fig. 2, and Fig. 5 is a detail perspective view illustrating the manner in which a side beam of a truck is attached to the axle thereof.

The vehicle as illustrated consists, primarily, of two trucks A and B, each supported by four wheels. The framework of each truck consists of two parallel side beams 10, which side beams rest upon axles 11 and 12. The side beams of the truck are adapted to have locking engagement with the axles, and to that end each axle is provided with a skein 13, and loop-hangers 14 are secured to the said beams 10 and are passed around the skeins 13, as shown in Fig. 5, the upper ends of the loop-hangers being threaded and provided with nuts, which are located at the upper portions of the side beams.

I desire it to be understood that the loop-hangers 14 are loosely passed around the skeins 13 and that the side beams 10 are recessed where they are carried over the skeins. A supporting-wheel 15 is mounted to loosely revolve upon each skein 13, and the forward truck A is provided with forward hounds 16, the said hounds being attached to the side beams 10 in a pivotal manner by a rod or a bar 17, and the side beams 10 are connected at the rear of the rear axle of a forward truck by a bar 18 parallel with the forward bar 17. The rear truck B is provided with forward hounds 16$^a$, attached to the side beams of said truck by a rod or bar 17$^a$ corresponding to the rod or bar 17 of the forward truck, and the side beams of the rear truck are connected at the rear by a rod 18$^a$, which corresponds to the rod 18 of the forward truck.

The forward truck A is provided with a central longitudinal beam 19, the front and rear rods 17 and 18 being loosely passed through this central beam, as is best shown in Fig. 2. The central beam 19 is attached to the axles 11 and 12 in an adjustable or pivotal manner, the attachment being made through the medium of bolts 20, which are passed through the longitudinal beam 19 and through the axles 11 and 12; but where the said bolts 20 pass through the axles 11 and 12 the axles are provided with tapering openings 21, as shown best in Fig. 4, the wider portions of the said openings being their bottom portions, so that the axles may rock on the central beam 19. A rocking bolster 22 is provided for the forward truck A. This bolster is pivotally attached to the central beam 19 of the forward truck through the medium of a king-bolt 23, and the said king-bolt, as shown in Fig. 1, is passed through a tapering opening 24 in the central beam or reach 19 of the forward truck. A clevis 26 is pivoted upon the rear rod 18 of the forward truck, and this clevis 26 is connected with a second clevis 27, which in its turn is connected with the forward hounds 16$^a$ of the rear truck.

The axles of the rear truck B are prevented from turning by passing a reach-bar 28 through the said axles and holding the said reach-bar in position by keys 29 passed through the bar and in engagement with opposing faces of the axle, as shown in Fig. 2. The rear truck B is provided with a stationary bolster 30. This bolster is attached to the side beams 10 of the rear truck through the medium of bolts 31, which are passed through the bolster and through tapering openings 32 in the side beams, as illustrated in Fig. 1, enabling the frame of the rear truck to move laterally and vertically irrespective of the bolster or the bolster to have corresponding movement on the said frame, since the nuts attached to the bolts 31 are not brought closely up to the said side beams, as shown in Fig. 1.

In operation it is evident that any wheel on the truck may pass an obstruction without materially interfering with its mating wheel or with any other wheel on either of the trucks, since the frame of each truck is capable of vertical and rocking movement on the axles, and the axles are capable of like movement with respect to the frame. In fact, as heretofore stated, the rear truck is of supple construction, enabling the vehicle to be drawn over exceedingly rough ground without interfering with the equilibrium of the load it may carry.

Each bolster is provided with blocks 33 at each side, so arranged as to have bearing upon the supports of the bolsters. The blocks are convex upon their under face, permitting the bolster to rock laterally; but the purpose of the blocks is to limit the lateral movement of the bolster.

Having thus described my invention, I claim as new and desire to secure by Letters Patent—

1. In a vehicle, a truck comprising a frame, axles loosely connected with the frame, whereby the frame is capable of movement upon the axles, supporting-wheels for the axles, a reach having rocking movement upon the axle, and a bolster mounted to rock upon the frame and reach, for the purpose specified.

2. A vehicle consisting of pivotally-connected trucks, each truck comprising a frame, axles connected with the frame, supporting-wheels for the axles, each axle being loosely connected with the frame and each frame having a rocking movement relative to the axles, one truck being provided with a rocking bolster, and a reach-bar supporting said bolster, having rocking engagement with the axle and similar engagement with the bolster, the other truck being provided with a bolster having rocking engagement with the side portions of the frame of the said truck, for the purpose set forth.

3. In a vehicle for heavy draft, the combination with a frame comprising side beams, axles upon which the side beams rest, loop-hangers loosely passed around the axles and secured to the side beams, and a draft device connected with said side-bars, of supporting-wheels loosely mounted on the said axles, a reach crossing the axles, bolts passed through the reach and through tapering openings in the axle, and a bolster carried by the said frame, and connected with the frame through the medium of a bolt passed through a tapering opening in the frame, for the purpose set forth.

JOHN LINDSEY.

Witnesses:
W. E. BROACH,
E. B. BROACH.